United States Patent [19]
Brown

[11] Patent Number: 5,878,615
[45] Date of Patent: Mar. 9, 1999

[54] APPARATUS AND METHOD FOR BENDING/CUTTING A WORKPIECE

[75] Inventor: Rodney E. Brown, Santa Fe, Tex.

[73] Assignee: Akard & Griffin, Houston, Tex.

[21] Appl. No.: 870,777

[22] Filed: Jun. 6, 1997

Related U.S. Application Data

[60] Provisional application No. 60/019,967 Jun. 17, 1996.

[51] Int. Cl.[6] ...................................................... B21D 7/02
[52] U.S. Cl. ................................ 72/214; 72/217; 72/294; 72/307; 72/338; 72/464; 72/369
[58] Field of Search ............................. 72/217, 218, 219, 72/214, 294, 307, 337, 338, 369, 464; 83/300; 29/560.1, 566.4

[56] References Cited

U.S. PATENT DOCUMENTS

| | | | |
|---|---|---|---|
| 4,561,279 | 12/1985 | Wears | 72/218 |
| 4,788,847 | 12/1988 | Sterghos . | |
| 4,798,078 | 1/1989 | Schweitzer . | |
| 4,833,907 | 5/1989 | Grinaldo | 72/478 |
| 4,845,867 | 7/1989 | Albrecht . | |
| 4,945,751 | 8/1990 | Ireland | 72/464 |
| 5,144,829 | 9/1992 | Fabro et al. | 72/217 |
| 5,203,192 | 4/1993 | Kimura | 72/219 |
| 5,259,232 | 11/1993 | Schweitzer . | |
| 5,297,584 | 3/1994 | Goad et al. . | |
| 5,632,175 | 5/1997 | Green et al. | 72/217 |
| 5,653,139 | 8/1997 | Lee | 72/219 |

FOREIGN PATENT DOCUMENTS 506575   9/1992   European Pat. Off. ................. 72/294

*Primary Examiner*—Joseph J. Hail, III
*Assistant Examiner*—Ed Tolan
*Attorney, Agent, or Firm*—Akard & Griffin

[57] ABSTRACT

A cutter/bender apparatus is provided for selectively cutting and bending a workpiece. The bending member includes a bending pin actuated by a hydraulic cylinder that moves the bending pin into and out of engagement with the workpiece to clamp the workpiece against a support plate. When clamped, another hydraulic cylinder lifts a movable bending member toward the workpiece, bending the workpiece about the bending pin in the process. The cutting member includes a fixed cutting member and a movable cutting member mounted in side to side abutment. The cutting members include a slot that extends laterally therethrough in which the workpiece to be cut is placed. The hydraulic cylinder that operates the movable bending member also provides motion for the movable cutting member. As the movable cutting member moves, it moves the aligned slots of the individual cutting members out of alignment, shearing the workpiece in the process. The cutter/bender apparatus may be attached to a loader vehicle using its hydraulic power for actuation or may include an independent power source. A carrier rack for the apparatus facilitates handling, positioning, and transport of the workpieces. Safety features, including a safety shut-off switch and a coupler member, incorporated into the apparatus make its use with a loader vehicle safer.

29 Claims, 8 Drawing Sheets

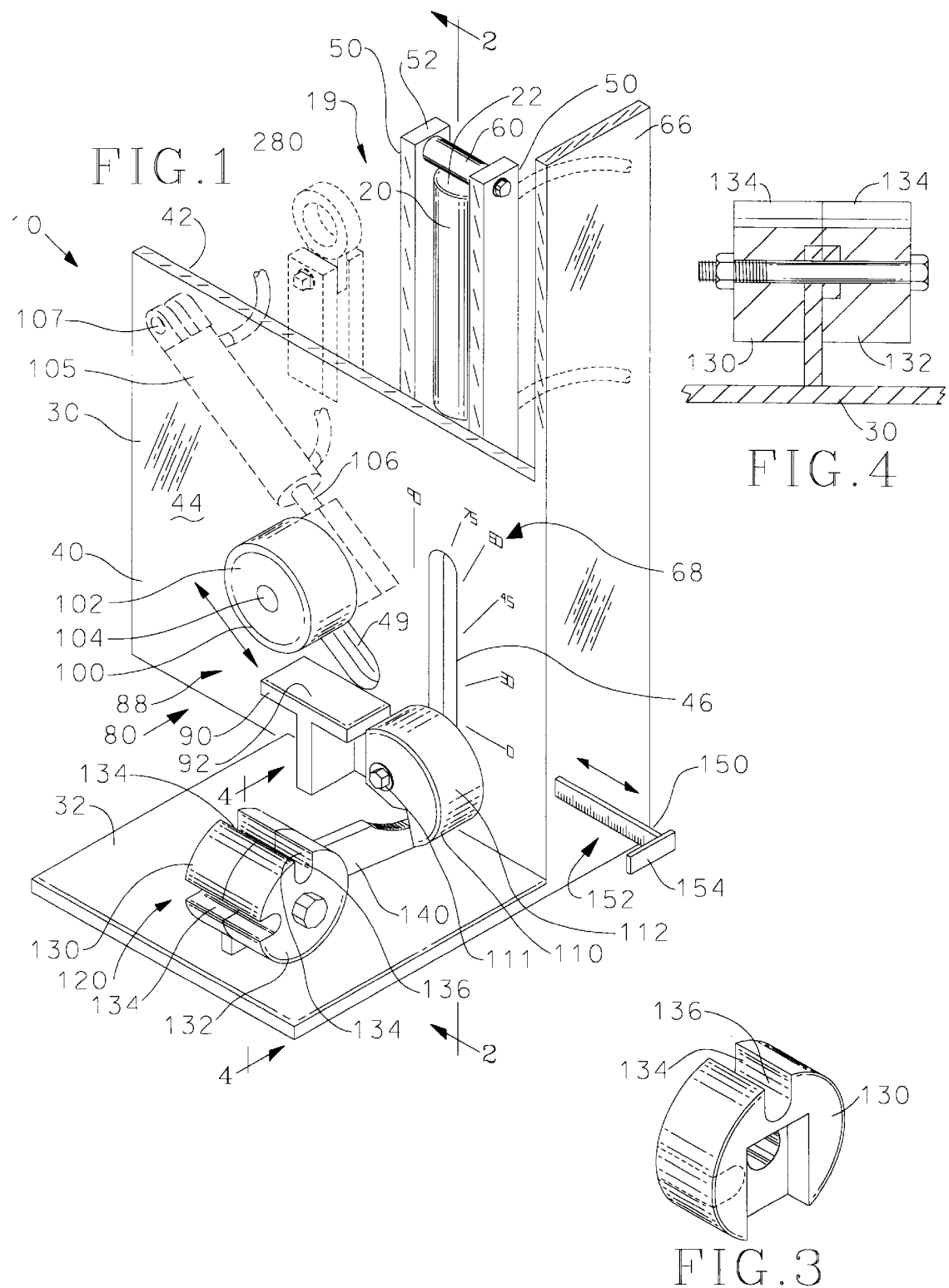

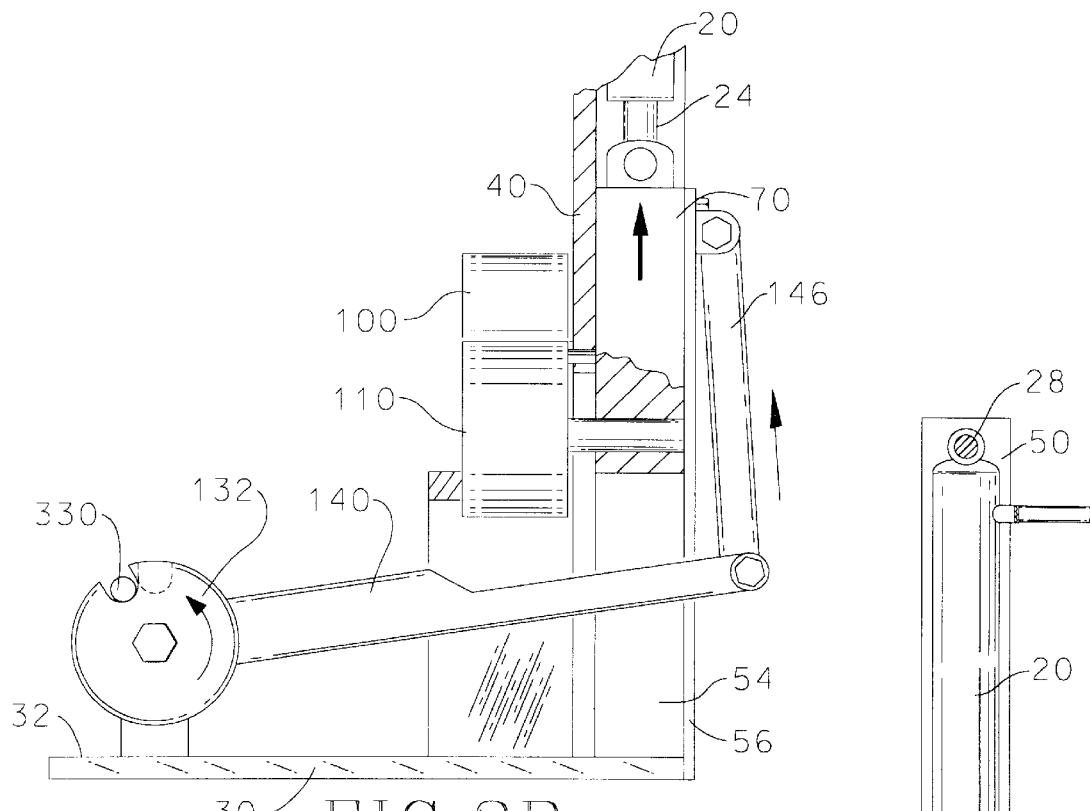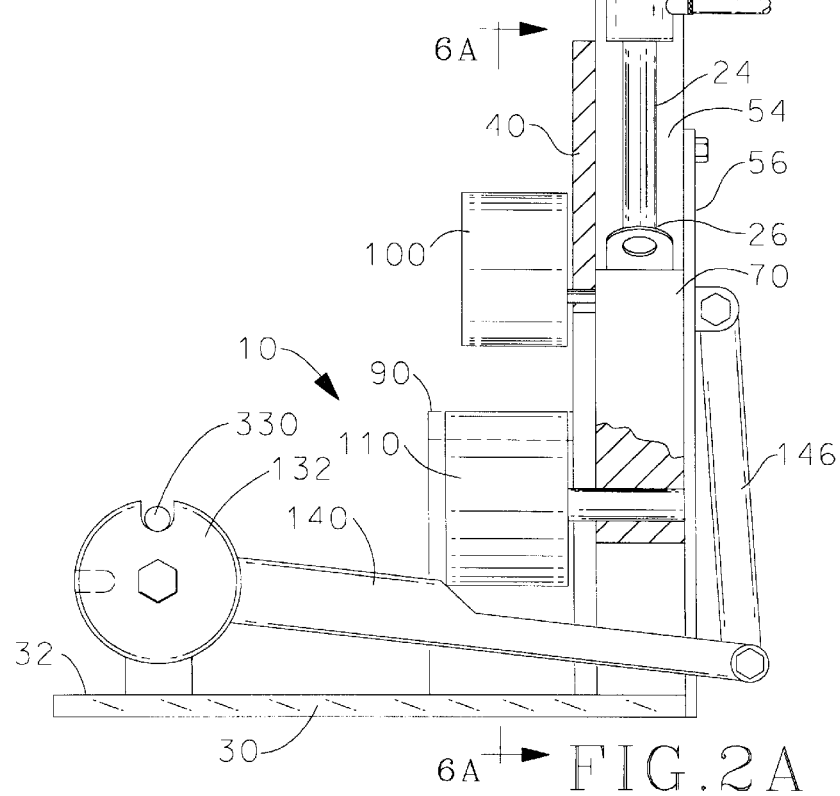

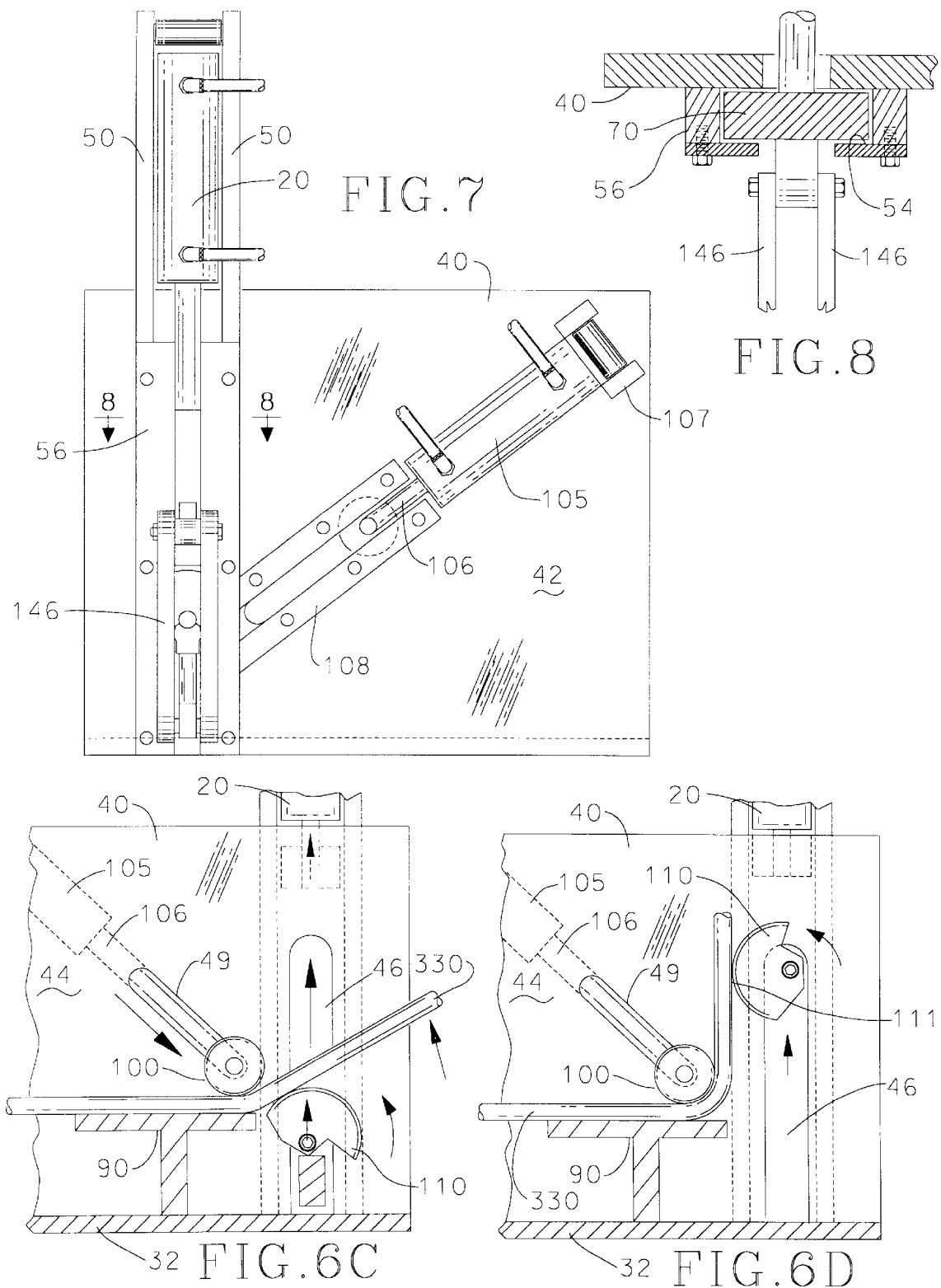

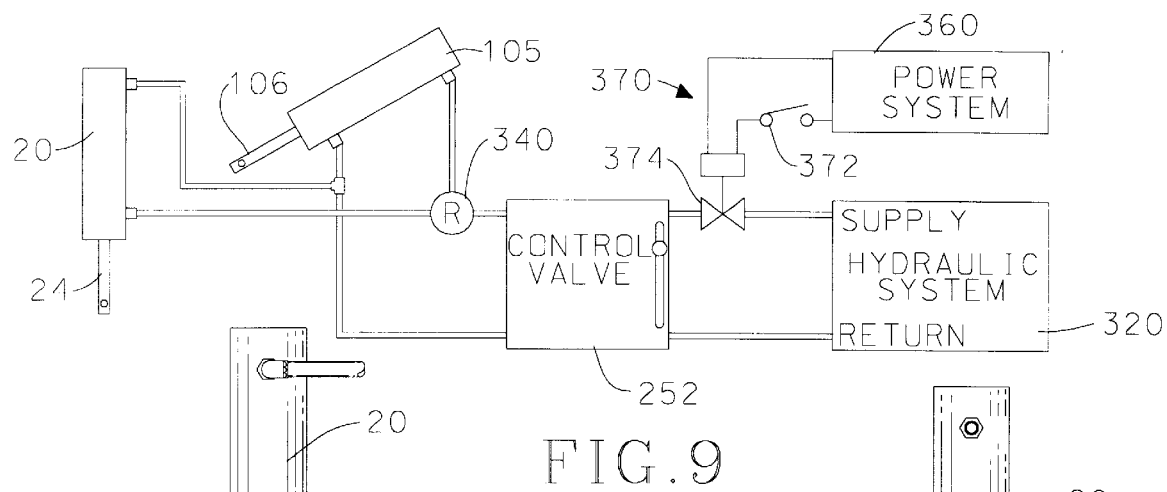
FIG. 9
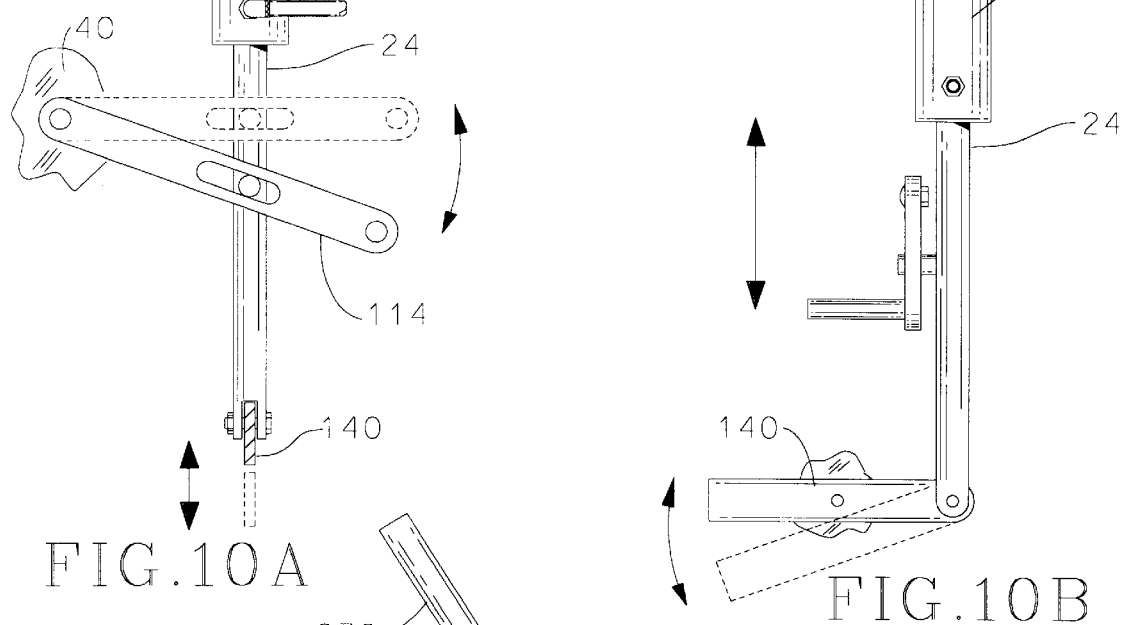
FIG. 10A
FIG. 10B
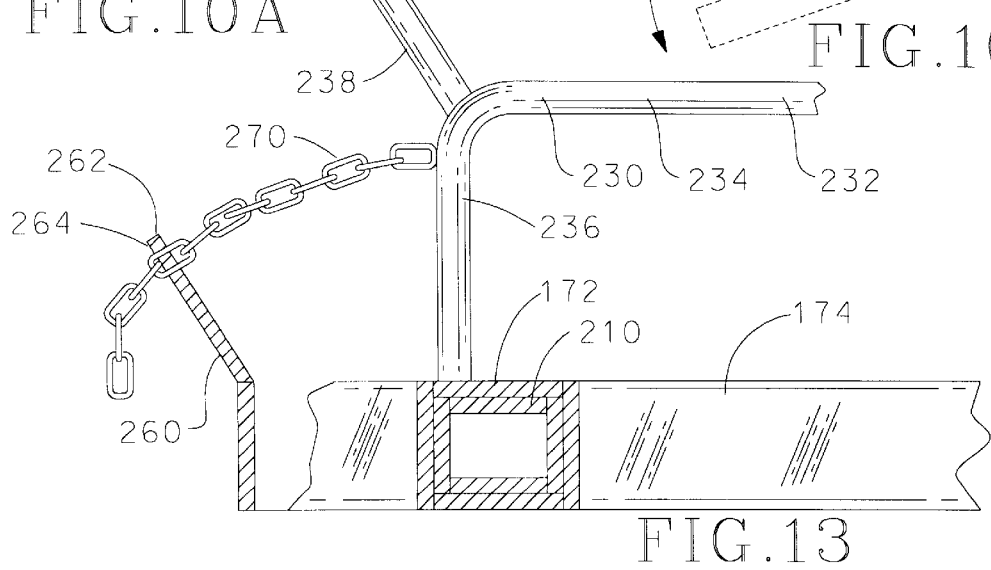
FIG. 13

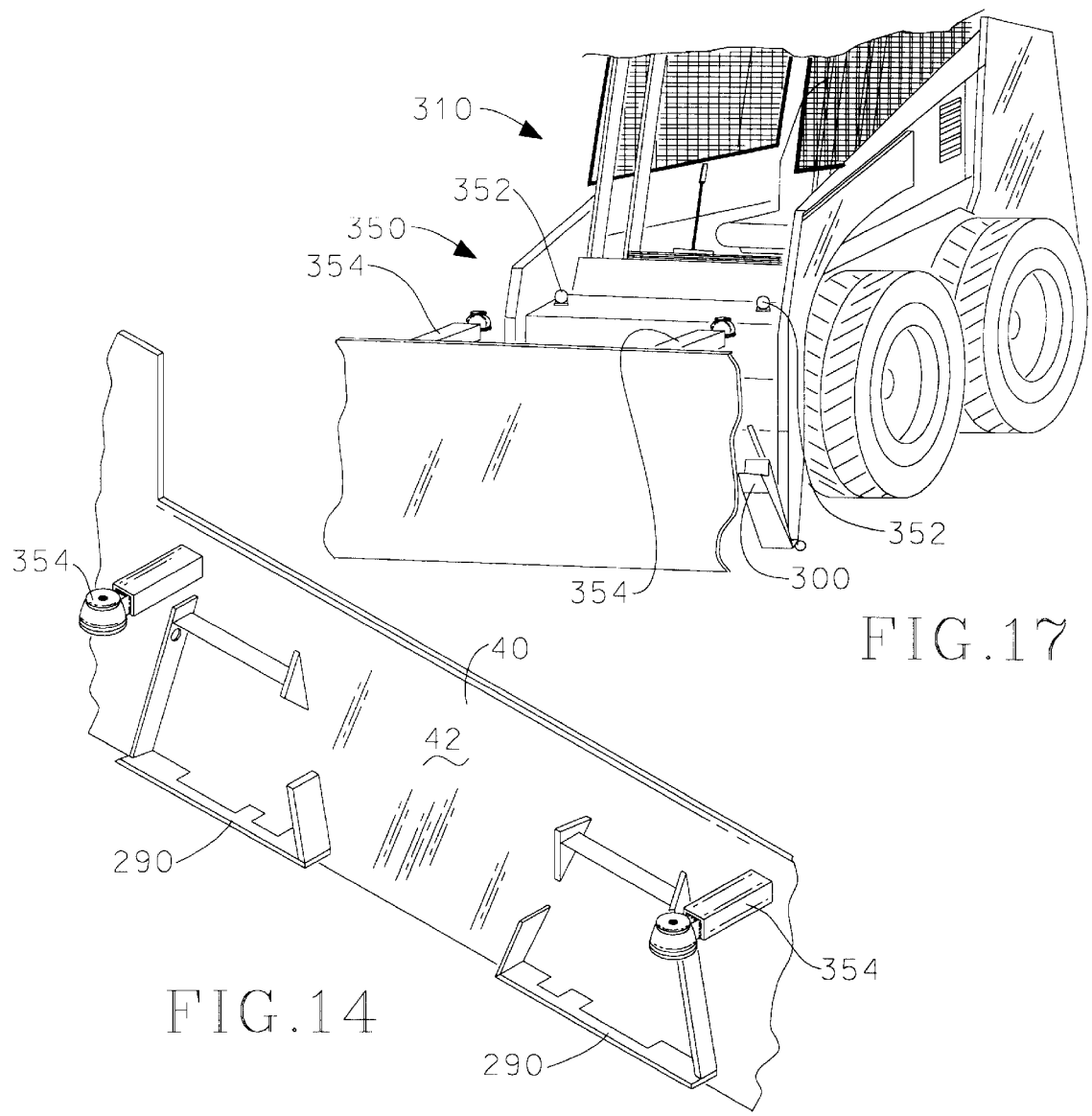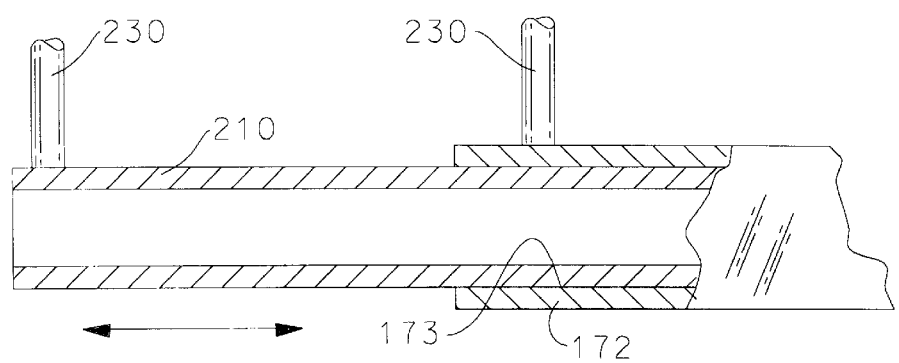

APPARATUS AND METHOD FOR BENDING/CUTTING A WORKPIECE

BACKGROUND OF THE INVENTION

This application claims the benefit of U.S. Provisional Application 60/019,967, filed Jun. 17, 1996.

FIELD OF INVENTION

This invention relates to a metal forming machine. More specifically, it is directed to a portable device capable of cutting and bending a workpiece, especially rebar, that uses a single hydraulic cylinder and provides for adjustment to accommodate various rod sizes.

Although the device is useful for cutting and bending all types of workpieces, particularly elongated workpieces, hereinafter the description shall refer to primarily rebar to aid simplicity and clarity of explanation.

Often, rebar used in construction to help fortify concrete structures must be cut or bent according to the requirements of the job. This bending and cutting is accomplished using one or more machines constructed for this purpose. However, the majority of known rebar benders and cutters are either (1) large stationary units that are located remotely from the work site or (2) manually operated devices that cause great fatigue to the user and are relatively slow in application. The large stationary units are typically located in factories that preform the rebar for transport to and use at the work site. Generally, these factories use a separate machine for performing each of the cutting and bending tasks. Additionally, even these devices are relatively large and difficult to transport to the place where the rebar is to be used. Thus, these smaller hydraulic units require that the rebar be transported between the machine and the work site. Accordingly, a machine that will cut and bend rebar and that can be transported to the work site is needed.

As used herein, loader vehicles include "skid-steer" loaders, backhoes, forklifts, sky-lifts, track-hoes, tractor loaders and other vehicles that include a hydraulic system and that are capable of removably receiving an attachment thereon. For ease of description, the following discussion will primarily focus on skid-steer loaders. However, other types of loader vehicles are addressed from time to time.

Generally, skid-steer loaders are vehicles designed to operate in rough terrain and perform a variety of functions. The loader vehicles include loader frame arms that extend in front of the loader vehicle and that may be raised and lowered by hydraulic cylinders. The same hydraulic power system that operates the frame arms may also operate auxiliary equipment on the loader vehicle. The ends of the frame arms include releasable attachments that permit rapid connection of auxiliary equipment to the loader vehicle. Also, the attachment enables tilting of the auxiliary equipment.

Consequently, the skid-steer loaders have evolved into multi-function vehicles as more and more attachments for the loader vehicles have been designed. Examples of attachments include dumping buckets, stump grinders, sweepers, trenchers, backhoes, angle blades, and pallet forks, among many others.

Like the skid steer loaders, other loader vehicles typically include loader frame arms that extend in front of the loader vehicle and that may be raised and lowered by hydraulic cylinders. They include a hydraulic power system that may operate auxiliary equipment on the loader vehicle. In addition, they typically have releasable attachments that permit rapid connection of auxiliary equipment to the loader vehicle. Included among these are many forklifts that are now designed for rough terrain. A number of forklifts have been adapted to receive auxiliary equipment that may be actuated using the hydraulic system of the forklift.

RELATED ART

Prior efforts have attempted to provide for bending and cutting of rebar. Also, prior efforts have utilized loader vehicle hydraulic power systems to operate auxiliary equipment. However, these prior efforts do not provide hydraulically powered units that can both cut and bend rebar utilizing a single hydraulic cylinder. Further the devices do not show a cutter and bender that attaches to a loader vehicle and that utilizes the hydraulic power system of the loader vehicle to power the device.

SUMMARY OF THE INVENTION

Accordingly, the objectives of this invention are to provide, inter alia, an apparatus and method for bending/cutting a workpiece that:

bends and cuts one or more workpieces;

adjusts to accommodate the various sized diameters of rebar;

provides for repeatability in the bend angle.

utilizes hydraulic power to effect the bending and cutting;

uses a single hydraulic cylinder to actuate the cutting and bending;

incorporates a single cylinder to accomplish both bending and cutting;

performs the bending and cutting operations with the workpiece oriented for bending parallel with the workpiece oriented for cutting;

provides for selective mounting to a loader vehicle;

may include it own independent hydraulic power system;

may mount to or include a trailer adapted to be towed behind a vehicle;

provides a carrier rack that can hold a plurality of workpieces thereon for storage and transport;

includes an expandable support structure for supporting the workpiece, for easing manipulation of the workpiece, and for enhancing support of the workpiece during transport;

provides a carrier rack for ease of workpiece handling; and is low in cost, simple in implementation, and safe to use.

Other objects of the invention will become apparent from time to time throughout the specification and claims as hereinafter related.

To achieve such improvements, my invention provides a device for cutting and bending a workpiece that comprises a support frame, a bending member, and a cutting member. A support member is coupled to the support frame and is adapted to receive and hold the workpiece and prevent movement of the workpiece relative to the support frame. A movable bending member is coupled to the support frame at a position offset from the support member. Likewise, a fixed cutting member and a movable cutting member are coupled to the support frame. An actuating member is coupled to the support frame and interconnected to both the moveable bending member and the moveable cutting member. The actuating member is adapted to move the moveable bending member and the cutting member between a first position and a second position. The movable bending member is adapted and positioned to contact and move the workpiece as the movable bending member travels from the first position to the second position so that the support member and the moveable bending member bend the workpiece as the movable bending member travels from the first position to the second position. Similarly, the fixed cutting member and the moveable cutting member are adapted and positioned to receive the workpiece and shear the workpiece as the movable cutting member moves from the first position to the second position.

Another aspect of the present invention is a device for cutting and bending a workpiece that comprises that above described apparatus wherein the support frame is adapted for removable attachment to a loader vehicle.

A further aspect of the invention is a method for selectively bending and cutting a workpiece that comprises the steps of selectively placing the workpiece in a support member that is adapted to hold a portion of the workpiece stationary, moving a movable bending member that is offset from the support member toward the workpiece using an actuating member, selectively placing the workpiece in a cutting member having a fixed cutting member and a movable cutting member, and moving the movable cutting member relative to the fixed cutting member using the actuating member.

BRIEF DESCRIPTION OF THE DRAWINGS

The manner in which these objectives and other desirable characteristics can be obtained is explained in the following description and attached drawings in which:

FIG. 1 is a perspective view of the cutter/bender apparatus.

FIG. 2A is a side cross sectional view taken along lines 2—2 in FIG. 1 of the cutter bender apparatus in the first, lowered position.

FIG. 2B is a side cross sectional view taken along lines 2—2 in FIG. 1 of the cutter bender apparatus in the second, raised position.

FIG. 3 is a perspective view of an alternate cutting member head.

FIG. 4 is a front cross sectional view taken along lines 4—4 in FIG. 1 of the cutting member.

FIG. 6C is a front view of the bending member showing the bending member moving and bending the workpiece.

FIG. 6D is a front view of the bending member showing the bending member in the second, raised position wherein the workpiece is bent to approximately 90°.

FIG. 7 is a rear view of the cutter/bender apparatus.

FIG. 8 is a partial top cross sectional view of the sliding block.

FIG. 9 is a schematic view of the hydraulic system and the safety cut-off.

FIG. 10A is a partial front elevational view of an alternate design for the movable bending member.

FIG. 10B is a partial side elevational view of an alternate design for the movable bending member.

FIG. 13 is a partial cross sectional side elevational view of the carrier rack showing a support guide.

FIG. 14 is a partial perspective view of the rear of the cutter/bender apparatus.

FIG. 16 is a partial cross sectional side elevational view showing the extension tube within the base tube.

FIG. 17 is a partial perspective view of the cutter/bender apparatus and the loader vehicle showing their relative attachment for safety.

DETAILED DESCRIPTION OF THE INVENTION

Figure 6B:
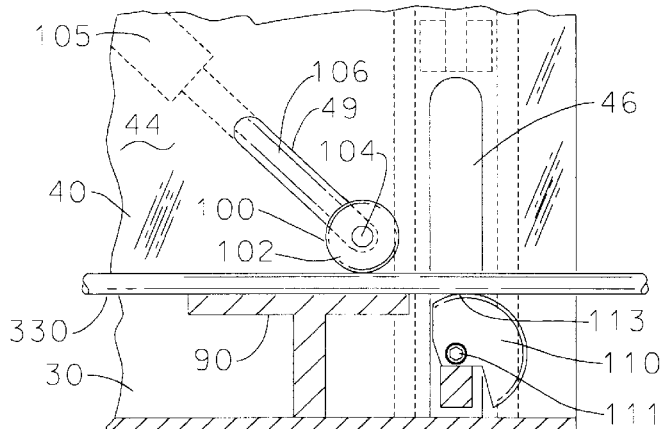
FIG. 6B is a front view of the bending member showing the apparatus with the bending pin in the lower, clamping position.

The present invention generally provides an apparatus that selectively bends and cuts a workpiece 330. More particularly, the present invention provides a cutting member 120 and a bending member 80 that are both attached to a support frame 30 and are actuated by an actuating member 19. As the actuating member 19 moves the cutting member 120 from a first position to a second position, the cutting member 120 shears the workpiece 330. Likewise, when the actuating member 19 moves the bending member 120 from a first position to a second position, the bending member 120 bends the workpiece 330. In the preferred embodiment, the cutter/bender apparatus 10 is adapted for removable attachment to a loader vehicle.

As previously stated, loader vehicles 310, as used herein, include "skid-steer" loaders, backhoes, forklifts, sky-lifts, track-hoes, tractor loaders and other vehicles that include a hydraulic system and that are capable of removably receiving an attachment thereon. The following description, which applies to the preferred embodiment, refers primarily to a skid-steer loader type of loader vehicle 310. However, the invention is not limited to this precise form of apparatus for it may apply to any number of loader vehicle types. In addition, the present invention has broader application in that it may be used without a loader vehicle 310 for it may include its own independent hydraulic power system or use some other hydraulic power source and may use any mode of transport or may be used in an immobile position or mounting.

Likewise, the following description uses the term "workpiece" to refer to any type of workpiece that requires bending or cutting. Examples of such workpieces include rebar or other relatively thin, elongated members that may be plastically deformed and/or sheared.

Further, the following description refers to the preferred embodiment as shown in the drawings. In this preferred embodiment, the bending is made in a vertical plane. However, it can be seen that the cutter/bender apparatus 10 could easily be made to bend in the horizontal plane—or any other plane.

Referring to FIG. 1, the cutter/bender apparatus 10 includes a support frame 30, a bending member 80, a cutting member 120 and an actuating member 19. Although the support frame 30 may take many forms, the preferred support frame 30 includes a base 32 and a vertical support 40 perpendicular to the base 32. The bottom edge of the vertical support 40 is fixedly attached to the rear edge of the base 32 and the vertical support 40 extends upward therefrom. A pair of support arms 50 extend parallel to one another in a direction perpendicular to the base 32. The support arms 50 attach to the back surface 42 of the vertical support 40 and extend upward from the base 32. An upper connecting bar 60 stabilizes the support arms 50 at their upper ends 52.

The back 22 of first hydraulic cylinder 20 mounts to the upper end 52 of the support arms 50 using a pin connection 28 or other suitable connector. The first hydraulic cylinder 20 extends downward therefrom such that the ram 24 faces downward. The ram 24 is movable between a first position, wherein the ram 24 is extended, and a second position, wherein the ram 24 is retracted. Preferably, the lower end 26 of the ram 24 connects to a sliding block 70.

The first hydraulic cylinder 20 may be powered by either (1) an independent hydraulic power system mounted to the cutter/bender apparatus 10, (2) the hydraulic power system of a loader vehicle 310, or (3) the hydraulic power system of some other vehicle or device. Both of the hydraulic power systems 320 are known and are referred to herein generally as the hydraulic power system 320. Attachment of the cutter/bender apparatus 10 to a loader vehicle 310 is more fully discussed hereinafter. Basically, the first hydraulic cylinder 20 is in flow communication with the hydraulic power system 320. Therefore, the flow of hydraulic fluid from the hydraulic power system 320 into the first hydraulic cylinder 20 produces and controls the movement and position of the ram 24. In the preferred embodiment, the first hydraulic cylinder 20 and the hydraulic power system 320 act as the actuating member 19 for the cutter/bender apparatus 10 and provide the required movement therefor between the first position to the second position and back.

Preferably, the support arms 50 form slide grooves 54 within which the sliding block 70 rides. The size and construction of the sliding block 70 and the slide grooves 54 are such that the movement of the block 70 is restricted to linear motion. As shown in the figures, one possible construction is that each support arm 50 forms a channel 56 and the channels 56 face one another. The block 70 has a rectangular cross section having a cross sectional area that is slightly smaller than the rectangular cross sectional area defined by the channels 56. Further, the length and width of the block 70 are slightly smaller than the length and width of the rectangle defined by the channels 56. The sliding block 70 acts as a ram connecting member for connecting the ram 24 to the bender portion and as a motion restriction means for limiting the motion of the ram 24 lower end to linear movement.

Referring to FIG. 1, the bending member 80 of the device includes a support member 88 coupled to the support frame 30 and adapted to receive and hold a portion of the workpiece 330 to prevent movement of the workpiece 330 relative to the support frame 30. Generally, the support member 88 includes a bending support plate 90 and a bending pin 100. Both the bending support plate 90 and the bending pin 100 extend from the front surface 44 of the vertical support 40 perpendicular thereto. The bending support plate 90 preferably has a relatively flat upper surface 92 oriented parallel to the base 32. However, a rod or other fixed shape may serve as the bending support plate 90. The support plate 90 is fixedly attached to the vertical support 40 and is substantially rigid so that it can support the workpiece and prevent its relative movement during the bending process. Additionally, the support plate 90 is positioned and adapted so that it extends horizontally beyond the bending pin 100 in a direction away from the movable bending member 110. Because the movable bending member 110 applies a force to the workpiece 330 to bend it around the bending pin 100, to provide the proper support, the support plate 90 must provide a counteracting, opposite force on the opposite side of the bending pin 100 that prevents the rotation and movement of the workpiece 330 about the bending pin 100 to ensure the stability during the bending operation and repeatability of bending angles. The bending pin 100 is offset vertically from the bending support plate 90 and is spaced therefrom. The space between the bending support plate 90 and the bending pin 100, including its component parts as hereinafter discussed, is sufficient to allow a workpiece 330 lying parallel to the base 32 to fit therebetween.

The workpiece 330 is bent about the bending pin 100. Workpieces 330 may come in a variety of diameter sizes. For example, rebar diameters vary from about ¼ inch to over 1 inch. In addition, the workpieces 330 of the same nominal diameter actually have slightly different diameters which can affect the repeatability of the bend angle. Due to the variety of workpiece 330 sizes and the inconsistencies in diameters of the same nominal diameter, the bending pin 100 preferably adjusts to accommodate the variations.

In the preferred embodiment, the cutter/bender apparatus 10 includes a moveable bending pin 100 to accommodate the different workpiece diameters. In this preferred embodiment, the bending pin 100 extends through a bending pin slot 49 in the vertical support 40 of the support frame 30. The bending pin slot 49 is an opening through the vertical support 40. The bending pin 100 is attached to a ram 106 of a second hydraulic cylinder 105 that is attached to the back surface 42 of the vertical support 40 by a connector 107. A support channel 108 attached to the back surface 42 of the vertical support 40 provides support for the second hydraulic cylinder 105 preventing its motion away from the back surface 42. The support channel 108 forms a channel within which the ram 106 can move axially relative to the second hydraulic cylinder 105. The cutter/bender apparatus 10 may include a second sliding block similar to the sliding block 70 attached to the end of the ram 106 that provides attachment to the bending pin 100 and helps stabilize the ram 106 in the support channel 108.

Figure 6A:
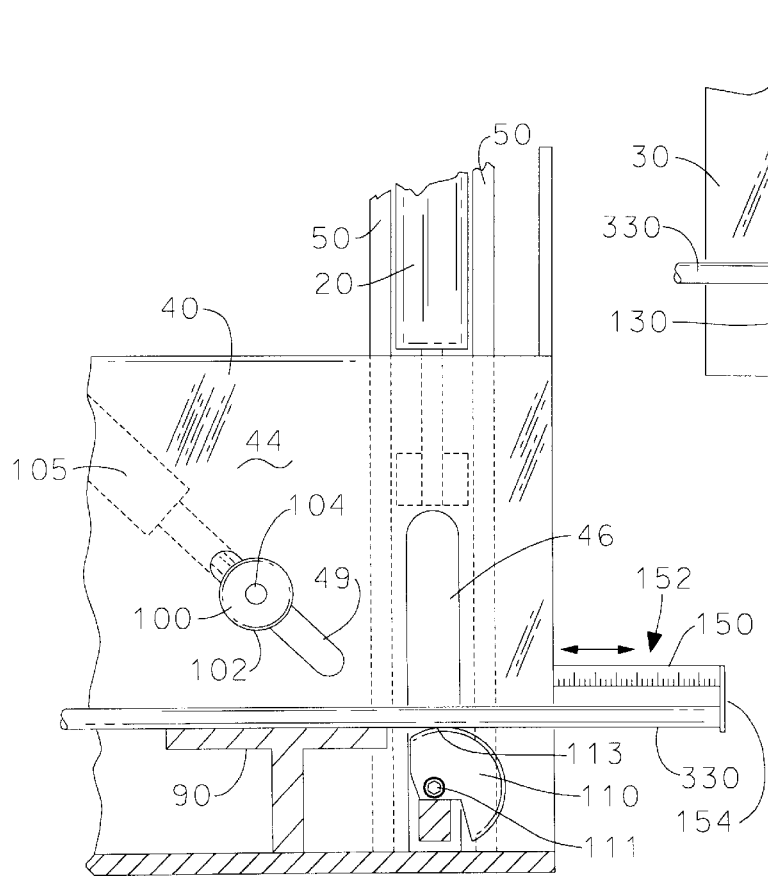
FIG. 6A is a front view of the bending member taken along lines 6A—6A in FIG. 2A showing the apparatus in the first, resting position.
Figure 11A:
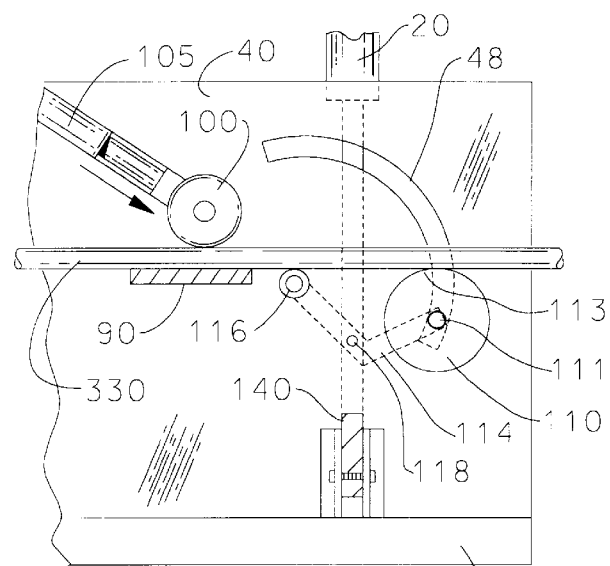
FIG. 11A is a front elevational view of an alternate bending member in the first position.
Figure 11B:
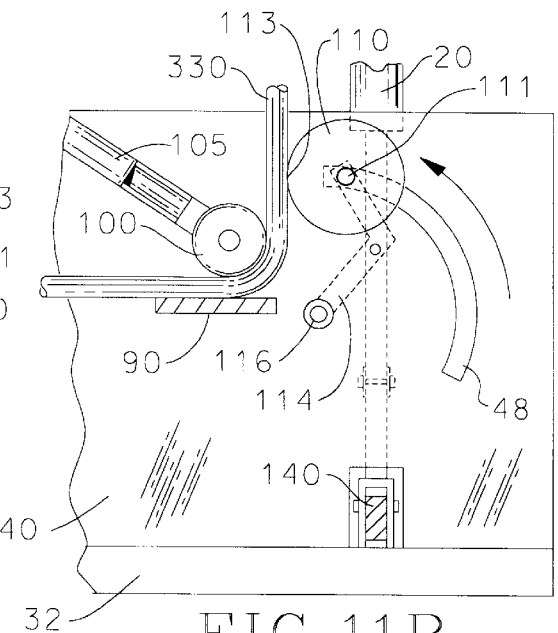
FIG. 11B is a front elevational view of an alternate bending member in the second position.

Referring to FIGS. 6A and 6B, the second hydraulic cylinder 105 and the bending pin slot 49 are positioned and oriented such that the axial motion of the ram 106 relative to the second hydraulic cylinder 105 moves the bending pin 100 toward and away from a workpiece 330 placed on the support plate 90. Thus, the second hydraulic cylinder 105 moves the bending pin 100 from an initial, raised position, or first position, downward toward the workpiece 330 until they abut one another and the workpiece 330 is held between the bending pin 100 and the support member 90. Once the bending pin 100 is in this abutting, clamped position, or second position, the motion of the bending pin 100 is stopped. As shown in FIG. 9, this downward motion of the bending pin 100 is preferably stopped automatically by providing a relief valve 340 in the hydraulic fluid supply line that is set to redirect the fluid supply once the pressure within the system reaches a predetermined pressure. As the bending pin 100 abuts the workpiece 330 and presses it against the support member 90, the pressure within the hydraulic system rises until the pressure is sufficient to trip the relief valve 340. However, the downward pressure of the bending pin 100 on the workpiece 330 remains at or about the predetermined pressure until released. In the preferred embodiment, the second hydraulic cylinder 105 and the bending pin slot 49 are oriented at 45° to the horizontal so that the bending pin 100 moves at 45° to the horizontal. With this preferred design, the distance that the bending pin 100 travels downward is equal to the distance that it travels laterally facilitating the repeatability of the bending and enabling 90° bends regardless of the diameter of the workpiece 330. Further, as the bending pin 100 moves from the first position to the second position, it moves toward the movable bending member 110 as shown in the drawings.

Figure 12:
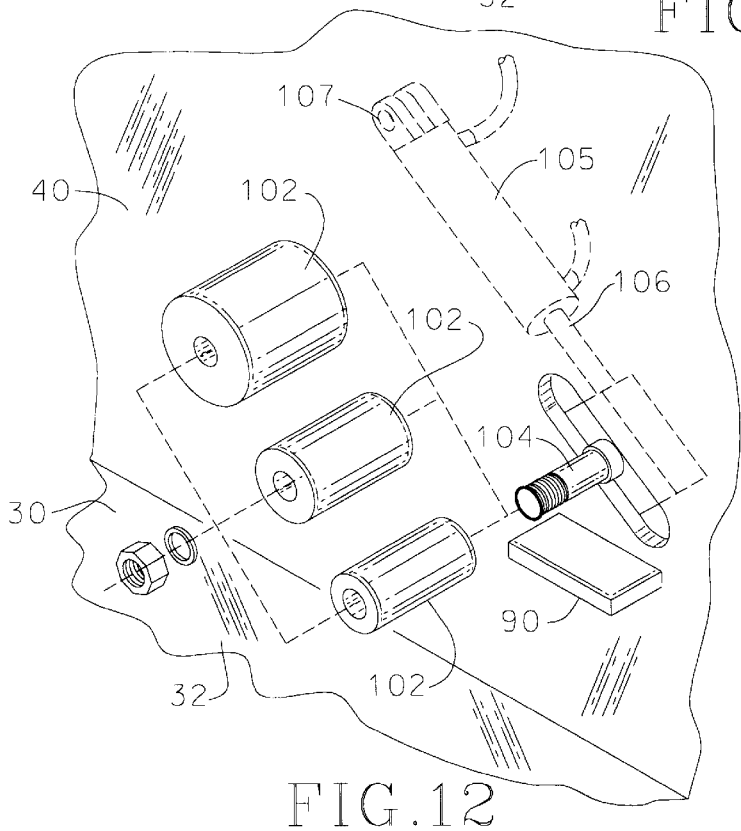
FIG. 12 is a perspective view of the bending pin showing the removable sleeves each having a different diameter.

As shown in FIG. 12, the bending member 80 may include sleeves 102 that may be removably and selectively placed on the bending pin 100 to obtain different bending radii of the workpiece 330. Various standards, such as those that concern the bending of rebar, set forth the preferred bending diameters for particular applications. For example, some standards dictate that the bend radius of rebar should be between 4 and 6 times the diameter of the rebar depending upon the application. To accommodate these standards, the cutter/bender apparatus 10 may include a plurality of sleeves 102 each having a different diameter. For example, in the case of rebar, the cutter/bender apparatus 10 could include a separate sleeve 102 for each needed bending radius taking into account the different nominal available rebar diameters. The movable bending pin 100 facilitates the use of the different diameter sleeves 102 by moving the axis of the sleeve 102 upward to accommodate the varying distances required for of the different diameter of workpieces 330 and the different diameter of sleeves 102. Accordingly, the movable bending pin 100 design enables the cutter/bender apparatus 10 to meet the radius requirements of the various standards. If the bending pin 100 were stationary and did not move, the diameter of the sleeve would necessarily get smaller to accommodate the larger diameter workpiece 330—although some sort of complicated set of sleeves having the attachment of the sleeve 102 to the vertical support 40 offset from the sleeve axis is possible. However, as the sleeves became smaller in this fixed bending pin 100 design, the bending radius would eventually become small with larger diameter workpieces 330 that they would tend to break rather than bend due to the small bending radius. Another advantage of the movable bending pin 100 is that it frees the hands of the user allowing the user to release the workpiece 330 prior to making the bend. This feature increases the safety of the cutter/bender apparatus 10 because it moves the user further from the moving parts of the cutter/bender apparatus 10.

By incorporating the 45° design the discrepancy between the distance of the moveable bending member 110—more fully described below—from the bending pin 100 is minimized, especially when considering the different diameter sleeves 102. The 45° design enhances the repeatability of the bending angle by helping to ensure that the distance from the bending pin 100 to the movable bending member 110 is essentially constant, regardless of the size of the sleeve or the variations of the workpiece diameter from its nominal diameter.

In an alternate embodiment, the bender/cutter apparatus 10 includes a plurality of sleeves 102 constructed to removably slide onto a central, stationary support post, the bending pin 100, to accommodate the different diameters of workpieces 330. Each of the sleeves 102 has a different outer diameter from the other sleeves 102. The outer diameter of each of the sleeves 102 corresponds to the optimum bending radius for one size of workpiece 330. Therefore, the cutter/bender apparatus 10 includes a sleeve for bending ¼ inch workpiece, a sleeve for bending ½ inch workpiece, a sleeve for bending ⅝ inch workpiece, etc. Preferably, the device includes sleeves 102 for each sixteenth inch interval. The sleeves 102 may be interchangeably replaced on the central support post depending upon the size of workpiece 330 to be bent. However, as mentioned previously, this design is not preferred because, as the workpiece diameter gets larger, the sleeve diameter must get smaller. Therefore, the stationary bending pin 100 using interchangeable sleeves 102 cannot meet the radius requirements imposed by the various standards without incorporating a very complicated set of sleeves 102 having offset attachment bores for their attachment to the bending pin 100.

The vertical support 40 includes a vertical slot 46 extending therethrough horizontally offset from the bending pin 100, and support member 88 see FIGS. 1 through 2B and 7). The movable bending member 110 is pivotally attached to the sliding block 70 and extends through the vertical slot so that the movable bending member 110 extends perpendicularly from the front surface 44 of the vertical support 40. Accordingly, the first hydraulic cylinder 20 is preferably vertically oriented and aligned horizontally with the vertical slot 46. In the first, or lowered, position, the movable bending member 110 is horizontally offset from the bending pin 100 and the upper surface 112 of the movable bending member 110 is substantially horizontally aligned with the upper surface 92 of the support plate 90. Therefore, the workpiece 330 to be bent is placed between the support plate 90 and the bending pin 100 and rests on the upper surfaces, 92 and 112, of the support plate 90 and the movable bending member 110 (See FIGS. 6A through 6D). The bending pin 100 is moved from its first position to its second, clamping, position wherein it abuts the workpiece 330 forcing the workpiece toward the support plate 90 (FIG. 6B). The movable bending member 110 then moves from its first, lowered position, to a second, raised position (FIGS. 6C and 6D). During this motion of the movable bending member 110, the movable bending member 110 moves toward the workpiece 330 forcing the workpiece 330 upward. However, a portion of the workpiece 330 is held stationary at the support member 88.

Therefore, the workpiece 330 is bent around the bending pin 100 and plastically deformed creating a permanent bend in the workpiece 330. The angle of the resulting bend may be adjusted by stopping the upward motion of the movable bending member 110 when the desired angle is reached.

An alternate design omits the sliding block 70 and employs a different type of movable bending member 110 (See FIGS. 10A through 11B). In this alternate design, the movable bending member 110 extends through an arc-shaped slot 48 in the vertical support 40 and attaches to a pivotally mounted roller arm 114. The arc-shaped slot 48 has a central axis that is proximal the support member 88. The roller arm 114 attaches to the back surface 42 of the vertical support 40. The pivot point 114 is positioned such that when the roller arm 114 pivots, the movable bending member 110 follows and slides within the arc-shaped slot 48. A linkage 118 pivotally connected to both the roller arm 114 and the ram 24 translates the motion of the ram 24 into motion of the roller arm (See FIGS. 11A and 11B). In the first position, the movable bending member 110 is offset from the base 32 a distance approximately equal to the offset of the bending support plate 90. As the ram 24 moves to the second position, the movable bending member 110 follows the arc-shaped slot 48 upward, away from the base 32, and horizontally toward the bending pin 100. Therefore, workpieces 330 placed upon the movable bending member 110, in the first position, are bent as the movable bending member 110 travels to the second position.

The movable bending member 110 preferably includes an arcuate upper surface 112 that is roughened to increase the coefficient of friction between the upper surface 112 and the workpiece 330. As previously described, when the ram 24 is in the first position, the movable bending member 110 is positioned such that its upper surface 112 is vertically offset from the base 32 a distance equal to or less than the upper surface of the bending support plate 90. In this position, a workpiece 330 lying parallel to the base and extending between the bending support plate 90 and the bending pin 100 also extends over and rests on the movable bending member 110.

As the ram 24 moves from the first position to the second position, as shown in FIGS. 6A through 6D, the ram 24 forces the movable bending member 110 vertically upward away from the base 32. During this upward motion, the movable bending member 110 forces the free end of the workpiece 330—the end not held stationary by the support member 88—upward. Because the workpiece 330 is supported between the bending pin 100 and the bending support plate 90, the workpiece 330 does not rotate about the bending pin 100, but instead bends and is plastically deformed about the bending pin 100. The higher the movable base moves, the greater the angle of bend of the workpiece 330. In the preferred embodiment, when the movable bending member 110 reaches the second position, the workpiece 330 is bent to a resultant ninety degree angle about the bending pin 100.

However, workpieces 330 are generally somewhat resilient. Therefore, when the bending force is released, the workpiece 330 tends to spring back slightly making the resulting angle of the bend slightly less than the angle to which the workpiece 330 was actually bent. Thus, to obtain a true resultant ninety degree or any other desired bend in the workpiece 330 when the force is released, the workpiece 330 must initially be bent beyond ninety degrees or the desired angle if other than ninety degrees.

As the movable bending member 110 forces the bending end of the workpiece 330 upward, the friction forces between the movable bending member 110 and the workpiece 330 cause the movable bending member 110 to rotate about its pivot point 111 (see FIGS. 6B through 6D). In an alternate embodiment, the device may include gears between the movable bending member 110 and the vertical support 40 that translate vertical motion of the movable bending member 110 into rotational motion of the movable bending member 110. The arcuate upper surface of the movable bending member 110 is adapted such that the distance between the pivot point 111 and the point of contact 113 between the workpiece 330 and the arcuate upper surface increases as the movable bending member 110 moves from the first position to the second position. Stated another way, the pivot point 111 is offset from the central axis of the movable bending member 110 so that the pivot point 111 is closer to the upper surface 112 contacting the workpiece 330 when the movable bending member 110 is in the first position than when in the second position. Accordingly, when the movable bending member 110 is in the second position, it is able to extend slightly over the bending pin 100 and, thereby, bend the workpiece 330 greater than ninety degrees.

However, even workpieces 330 of the same type, such as rebar, that are manufactured in different locations or at different types may have slightly different mechanical properties and, thus, a slightly different resilience. Therefore, the amount that one individual workpiece 330 must be bent to obtain a ninety degree bend may differ from a separate workpiece taken from a different manufacturer or different lot. Accordingly, the preferred cutter/bender apparatus 10 includes a plurality of removable movable bending members 110. Each of the movable bending members 110 of this preferred embodiment has a slightly different arcuate shape so that when the movably bending member 110 is in the second position, each of the movable bending members 10 force the workpiece 330 over the bending pin 100 a different amount. For more resilient workpieces 330, the user would use a movable bending member 110 that forces the workpiece further over the bending pin 100 and bends the workpiece to a greater degree than he would for less resilient workpieces 330. Preferably, the cutter/bender apparatus 10 includes three such movable bending members 110.

Although the components of the cutter/bender apparatus 10 are described herein primarily in terms of vertical and horizontal relationship, the exact angles and planes of the components may vary without departing from the invention. For example, the bending of the workpiece 330 may occur in a horizontal plane by adjusting the orientation of the bending member 80 components accordingly. However, in the preferred embodiment, the bending is done vertically. Bending the workpiece 330 vertically allows the user to stand nearer the cutter/bender apparatus 10 during bending and requires less horizontal area for making the bend. The vertical bending design provides added safety in that the workpiece 330 being bent does not sweep across a wide horizontal area while being bent as in a horizontal bending arrangement. Further, bending vertically facilitates the bending of a plurality of workpieces 330 at a time because the workpieces 330 may be simply placed side-by-side; whereas in a horizontal bender, the workpieces 330 must be stacked in order to bend a plurality of workpieces 330, a difficult proposition considering that the workpieces 330 typically have a circular cross section.

The support frame 30 may include a shield 66 extending the full height of the support frame 30, from the base 32 to the upper end 52 of the support arm 50. The shield 66 is attached to the end of the support frame 30 proximal the free end of the workpiece 330 and extends at an angle from the vertical support 40 in a rearward direction. This shield 66 prevents the workpiece 330, as it is being bent, from becoming caught on the end of the support frame 30.

The vertical support 40 may include markings 68 thereon that indicate the degree of bend from the horizontal. These markings 68 allow the user to gage the degree of bend and stop the bend when the desired degree of bend is reached.

The cutter member 120 of the device includes a fixed cutting member 130 and a movable cutting member 132 mounted in side-by-side abutment (see FIGS. 1 through 5B). The fixed cutting member 130 is fixedly attached to the base 32. The movable cutting member 132 may move relative to the fixed cutting member 130. Although the movable cutting member 132 may be constructed to slide relative to the fixed cutting member 130, preferably, the movable cutting member 132 is rotatably connected to the fixed cutting member 130 and rotates relative thereto.

A cutter arm 140 translates the vertical motion of the ram 24 into rotational movement of the movable cutting member 132. One end of the cutter arm 140 is fixedly attached to the movable cutting member 132. The opposite end of the cutter arm 140 is pivotally connected to one end of a cutter linkage 146. The opposite end of the cutter linkage is pivotally connected to the sliding block 70, or alternately the ram 24 itself. Accordingly, as the ram 24 moves vertically, the ram 24 moves the cutter linkage 146 and cutter arm 140 which, in turn, rotate the movable cutting member 132. Thus the first hydraulic cylinder 20 actuates both the cutting and bending of the cutter/bender apparatus 10 so that the cutter/bender apparatus 10 uses a single hydraulic cylinder to effect the cutting and bending motions.

Both the fixed cutting member 130 and the movable cutting member 132 have radial slots 134 therein that extend partially into the cutting members, 130 and 132, and extend the full width of the cutting members, 130 and 132. Although the slots 134 may comprise lateral holes through the cutting members, 130 and 132, they are preferably elongated slots 134 that open to the perimeter of the cutting members, 130 and 132, and have planar side walls 136. When the ram 24 is in the first position, the slots 134 are aligned. When aligned, the slots 134 form a single slot that is sufficiently wide and deep to receive at least one workpiece 330 therein, but is preferably sufficiently deep to receive a plurality of workpieces 330 therein (see FIGS. 2A and 5A). In the preferred embodiment, the bottom of the slot is vertically offset from the base 32 the same amount as the upper surface of the bending support plate 90 and they lie in the same horizontal plane relative to the base 32. In addition, the aligned slots 134 are oriented so that a workpiece 330 placed in the slots 134 is parallel to a workpiece 330 held in the support member 88 for bending.

Figure 5A:
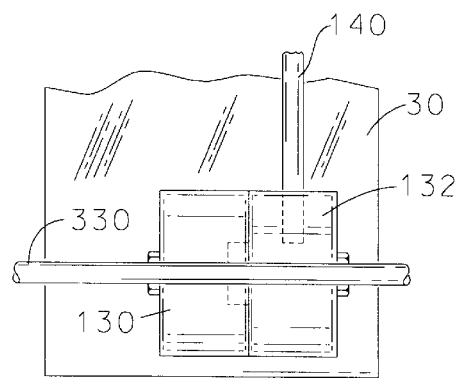
FIG. 5A is a top view of the cutting member in the first position with a workpiece positioned in the cutting slots.
Figure 5B:
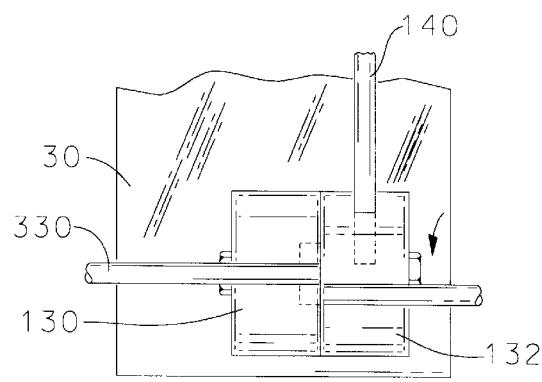
FIG. 5B is a top view of the cutting member in the second position after the cutting member has sheared the workpiece.

As the ram 24 moves from the first position to the second position, the movable cutting member 132 rotates from an aligned position, wherein the slots 134 are aligned, to an offset position, wherein the slots 134 are not aligned (See FIGS. 2B and 5B). In the offset position, the slots 134 do not abut one another. As the movable cutting member 132 rotates, any workpiece 330 within the slots 134 is sheared, and cut. The cutting members, 130 and 132, are made of a material that is sufficiently hard to effect the cut without themselves breaking.

A preferred embodiment of the cutting members, 130 and 132, is shown in FIG. 1. As shown in the figure, because of the location of the connections of the cutting members, 130 and 132, to the cutter arm 140 and the base 32 and because the types of connections are the same, a second slot 134 added to each of the cutting members, 130 and 132, makes them interchangeable. With this construction, when the set of slots 134 wears due to prolonged use, the cutting members, 130 and 132, may be switched and the second set of slots 134 used, thereby doubling the life of the cutting members, 130 and 132.

Alternate cutting member 120 designs may be based upon a "scissor" principle. In these alternate designs, a set of linkages may connect the ram 24 to a movable cutter blade and translate the motion of the ram 24 thereto. The movable cutter blade is pivotally mounted in side-to-side abutment with a fixed cutter blade. Motion of the ram 24 forces the movable cutter blade alternately between a closed position, wherein the movable cutter blade is in side-to-side abutment substantially along its full length, and an open position, wherein the free end of the movable cutter blade is raised from the fixed cutter blade. In the open position, only the pivot end of the movable cutter blade is in contact with the fixed cutter blade. The linkage may connect to the movable cutter blade at its free end or its opposite end. A workpiece 330 placed between the cutter blades when they are in the open position will be sheared by the cutter blades as they move to the closed position.

Thus, the cutter/bender apparatus 10 uses a single first hydraulic cylinder 20 to actuate bending and cutting of workpiece 330. Further, the cutter/bender apparatus 10 adjusts to accommodate the various sizes and radius requirements of workpieces 330 and to optimize the bending thereof and provide highly repeatable bending. The device provides parallel orientation of the bending and cutting operations in that a workpiece 330 being cut is oriented parallel to a workpiece 330 being bent. Further, the cutting and bending operations are performed on the same horizontal plane making the handling and transfer of the workpieces 330 between operations easier.

The device may also include a measurement bar 150 (See FIG. 1) that extends lengthwise from the bending end of the support frame 30. Preferably, the measurement bar 150 is slidably attached to the support frame 30 and includes measurement markings 152 thereon and a stop plate 154 at its free end. The measurement bar 150 is offset from the base 32 the same distance as the bending support plate upper surface 92. In use, the measurement bar 150 is extended to the length of the desired bend portion of the workpiece 330. This distance is the length of the workpiece 330 measured from the workpiece 330 bend to the workpiece 330 bend end. When the workpiece 330 is placed in the bending member 80, it is passed therethrough until it abuts the stop plate. The workpiece 330 is then bent. Alternatively, with a measurement bar 150 that does not have the stop plate 154, the user passes the workpiece 330 through the bending member 80 until the workpiece end reaches the appropriate measurement mark 152 on the measurement bar 150. Then, the user bends the workpiece 330.

Figure 15:
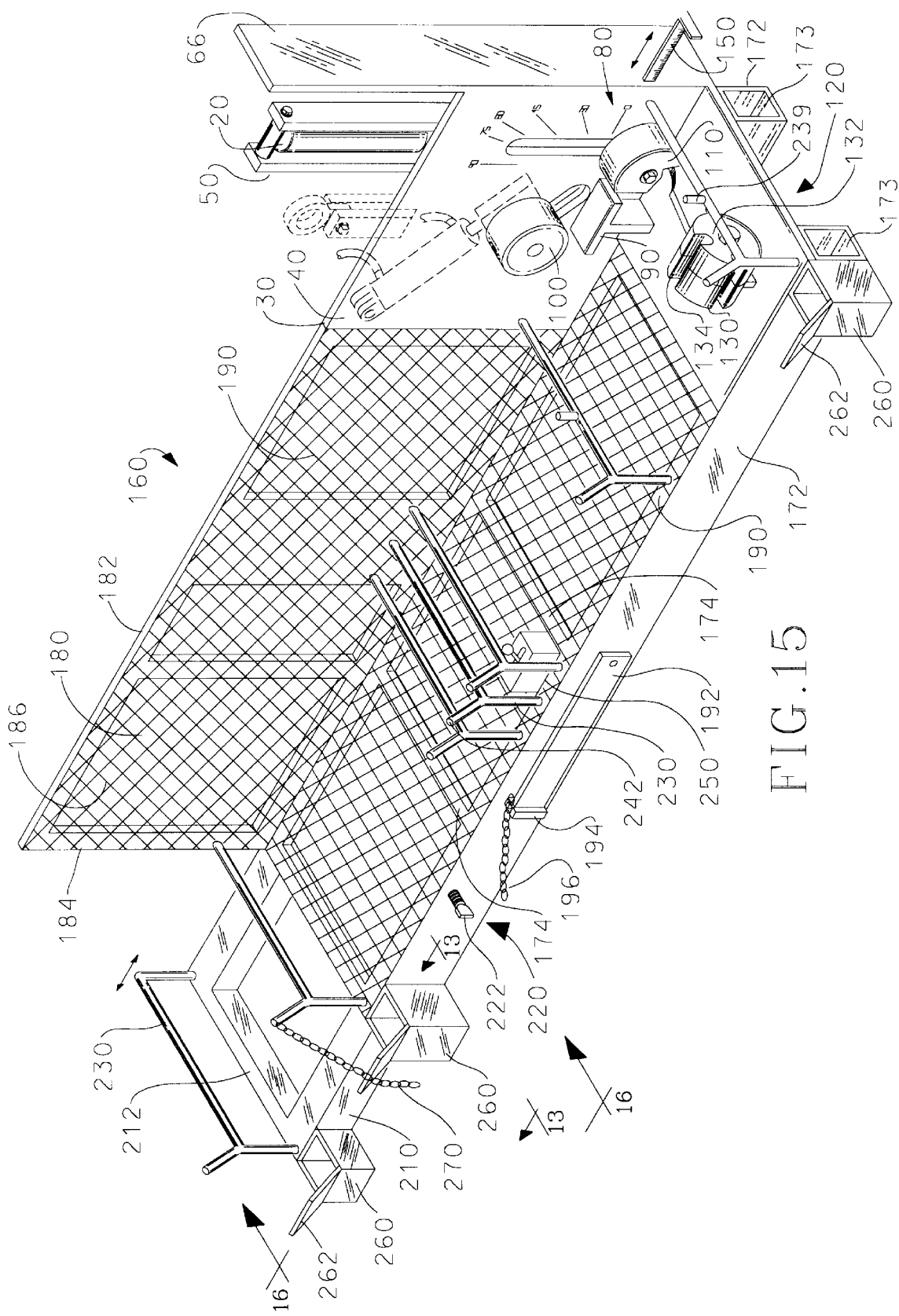
FIG. 15 is a perspective view of the cuter/bender apparatus showing the carrier rack.

As shown in FIG. 15, the support frame 30 preferably may mount, either removably or fixedly, to a carrier rack 160. Although the device may be transported without a carrier rack 160 (e.g. using a chain attached to the eye bolt 280 and a winch truck or forklift), the carrier rack 160 facilitates convenience of transport.

The carrier rack 160 includes an elongated rack frame 170. Preferably, the rack frame 170 comprises at least two base tubes 172 that extend parallel to one another. One of the base tubes 172 is positioned proximal the front of the base 32 and the other base tube 172 is attached to the base 32 proximal its back end. The base tubes 172 extend parallel to and below the base 32 of the support frame 30 in a direction parallel to a properly installed workpiece 330. The base tubes 172 extend from the support frame 30 from the support end of the base 32, the end nearest the support member 88 yet furthest from the movable bending member 110. In addition, the base tubes 172 extend beyond the opposite end of the base 32. A plurality of connecting members 174 extend between the base tubes 172 and maintain the relative position thereof. The base tubes 172 and connecting members 174 are relatively rigid and form a solid frame for supporting and holding the cutter/bender apparatus 10. A wire mesh 190 may be attached to and placed between the base tubes 172 to form a bottom for the carrier rack 160.

A rack back 180 extends upward at the back end of the rack frame 170. The height of the rack back 180 is preferably equal to the height of the vertical support 40 of the support frame 30. The rack back 180 includes an upper back support member 182 that extends parallel to the base tubes 172 from the support frame 30 in the same direction as the base tubes 172. At least one vertical connecting back member 184 connects the upper back support member 182 to the rear base tube 172. Wire mesh 190 may be placed between the tubes, 172 and 182, of the rack back 180 to form a back wall 186. Using wire mesh 190 rather than solid plate steel reduces the overall weight of the cutter/bender apparatus 10.

Each base tube 172 is hollow and has an axial cavity 173 therethrough that is open to the ends of the base tube 172.

An extension tube 210 is constructed to slidably fit within the cavity 173 having an outer shape and size that is substantially similar to, but slightly smaller than, the size and shape of the cavity 173. An extension tube 210 is positioned within each of the base tubes 172 so that it extends from the end of the base tube 172 that is distal the support frame 30. An extension linkage member 212 is attached to the ends of the extension tubes 210 that extend from the cavity 173 of the base tubes 172 connecting these ends of the extension tubes 210. The extension linkage member 212 is substantially rigid so that the extension tubes 210 move together as they slide within the base tubes 172.

A stop member 220 provides for the fixing of the position of the extension tube 210 within the base tube 172. The preferred embodiment of the stop member 220 is a threaded stop 222 extending through and threadably engaging the wall of the extension tube 210 proximal the end of the base tube 172 that is distal the support frame 30. The threaded stop 222 may be selectively screwed inward to engage the side wall of the extension tube 210 and, thereby, prevent its movement relative to the base tube 172.

Thus, the extension tubes 210 may be selectively pulled from the base tubes 172 to an extended position wherein they increase the overall length of the carrier rack 160 and the cutter/bender apparatus 10. Because the extension tubes 210 are connected together, they must be pulled from the base tubes 172 together. Likewise, the extension tubes 210 may be stored within the base tubes 172 to lessen the overall length of the cutter/bender apparatus 10, especially during transport and storage.

At least one support guide 230 attached to the rack frame 170 and spaced from the support frame 30 facilitates handling and support of the workpieces 330 during bending and cutting of the workpieces 330. Basically, each support guide 230 (shown in FIG. 13) is simply a guide rod 232 that extends from the rear of the rack frame 170 to the front of the rack frame 170 in a direction perpendicular to the base tubes 172 and the rack back 180 and parallel to the bottom of the carrier frame 160. The upper surface 232 of the guide rods 234 are horizontally oriented and are vertically offset from the base 32 a distance equal to the vertical offset of the bending support plate 90 and the movable bending member 110 when placed in the first position. Guide legs 236 support and maintain the position of the guide rods 232. The upper surface 234 of the guide rods 232 is relatively smooth to facilitate sliding of the workpiece 330 thereon. Proximal the front end of each of the guide rods 232 is a guide stop 238 that extends upward from the guide rod 232 and prevents the sliding movement of workpiece 330 beyond the guide stop 238. Thereby, the guide stop 238 prevents the workpieces 330 from rolling or sliding off of the support guides 230.

Preferably, the cutter/bender apparatus 10 includes a support guide 230 at the extreme end of the extension tube 210. In this way, the cutter/bender apparatus 10 may adjust to accommodate and support a variety of lengths of workpieces 330 because, as the extension tube 210 is pulled and extended from the base tubes 172, the support guide 230 attached thereto moves further from the support frame 30 and the other support guides 230 described below. Likewise, the cutter/bender apparatus 10 preferably includes a guide support 230 at each end of the rack frame 170. Further, in the preferred embodiment, the cutter/bender apparatus 10 includes a number of support guides 230 intermediate the ends of the rack frame 170. Wire mesh may be placed between and attached to these intermediate guide rods 232 to form a raised tray 242.

The support guides 230 nearest the sides of the support frame 30 include a cutter stop post 239 that extends upward from the guide rod upper surface 234. The cutter stop post 239 is positioned such that, when workpiece 330 is placed within the slots 134 of the cutter blocks, the workpiece 330 extends between the cutter stop post 239 and the guide stop 238. In such a position, the cutter stop post 239 and the guide stop 238 are relatively near the workpiece 330 and prevent the lateral movement of the workpiece 330. Because the cutting member 120 uses a shearing action, the workpiece 330 tends to rotate during cutting due to the torque created from the cutting forces. When the workpiece 330 rotates, the length of the required cut is increased because the cut is made upon a diagonal line rather than transversely through the workpiece 330. Thus, preventing rotation of the workpiece 330 decreases (1) the wear on the device, (2) the energy required to make the cut, and (3) the time required to make the cut. Because the shearing action is always made in the same direction, only one cutter stop post 239 is required.

At least one workpiece carrier 260 joined to the front of the cutter/bender apparatus 10 provides a trough for carrying workpieces 330 therein. Preferably, the cutter/bender apparatus 10 has a plurality of workpiece carriers 260 spaced along the front of the cutter/bender apparatus 10. Attaching one of the workpiece carriers 260 to the extreme end of the extension tube 210 allows the cutter/bender apparatus 10 to accommodate different lengths of workpiece 330 as the extension tube 210 is moved in and out of the base tubes 172.

Preferably, some of the workpiece carriers 260 are mounted proximal a support guide 230. A chain 270 attached to each support guide 230 near a workpiece carrier 260 has a sufficient length that it may reach beyond the forward end 262 of the workpiece carrier 260. A chain lock 264 in the forward end 262 of each workpiece carrier 260 comprises a slot. The slot has a width that is slightly wider than the narrow profile of a link in the chain 270. If a link in the chain 270 is placed in the chain lock 264, the adjacent links cannot pass through the chain lock 264 because they, necessarily, abut the chain lock 264 with their wide profile. After workpiece 330 has been placed within the workpiece carriers 260, the chain 270 may be placed over the top of the workpiece carrier 260 and locked in the chain locks 264. Thus, the chain 270 will prevent the workpiece 330 from bouncing from the workpiece carriers 260.

An eye bolt 280 (shown in FIG. 1) attached to the upper back support member 182 and extending upwardly therefrom is constructed for receipt of a chain or cable therethrough. By placing a chain through the eye bolt 280, a vehicle capable of raising the cutter/bender apparatus 10 using the chain can move and transport the cutter/bender apparatus 10.

However, the cutter/bender apparatus 10 is preferably transported by attaching the device to a loader vehicle 310 (see FIGS. 14 and 17). As mentioned, the ends of the loader vehicle frame arms for skid-steer and other types of loaders—as opposed to forklifts—include releasable attachments that permit rapid connection of auxiliary equipment to the loader vehicle 310. Attachment members 300 provide selective, removable attachment of the cutter/bender apparatus 10 to the loader vehicle 310. Accordingly, the attachment members 300 merely comprise the loader vehicle connectors and matching connectors 290 secured to the back of the rack frame 170. These connectors are known to those skilled in the art. The rack frame 170 includes the matching connectors 290, attached to the back of the rack frame 170. Likewise, forklifts and the like have been adapted so that auxiliary attachments may be connected to them. By connecting the device to the loader vehicle 310, the loader vehicle 310 may maintain the device at a height that is comfortable for using the device. Typically, such a height is achieved with the base approximately even with the user's waist.

Another preferred method of transporting the cutter/bender apparatus 10 involves mounting it on a trailer or making the carrier rack 160 into a trailer by adding an axle, a pair of wheels, and a trailer hitch. Any number of transport means are possible, particularly considering that the cutter/bender apparatus 10 may include its own, independent hydraulic power system 320. Of course, the cutter/bender apparatus 10 may be used without any transport and may be mounted in a single location.

One concern when operating the cutter/bender apparatus 10 while it is attached to a loader vehicle 310 is safety. As previously described, the loader vehicle 310 is capable of lifting and tilting auxiliary attachments, such as the cutter/bender apparatus 10 connected thereto. The present invention addresses this concern using two independent safety mechanisms. The first safety mechanism, as shown in FIGS. 14 and 17 comprises at least one, but preferably two, safety coupler members 350. The coupler member 350 includes a coupler ball 352 affixed to the loader vehicle 310 and a coupler receiver 354 attached to the carrier rack 160. The coupler balls 352 resemble trailer hitch balls and are positioned on each side of the loader vehicle. Likewise, the coupler receivers 354 are similar to standard trailer hitches. They extend perpendicularly from the back of the carrier rack 160. The coupler receivers 354 are spaced from one another and are positioned and adapted to mate with the coupler balls 352. As with standard trailer hitch and ball arrangements, the coupler receiver 354 has a socket at its end distal its attachment to the carrier rack 160. The socket is shaped and sized to receive the carrier ball 352 therein and includes a locking mechanism that maintains the carrier ball 352 therein. When the carrier balls 352 are locked in the sockets of the carrier receivers 354, the coupler member 350 locks the cutter/bender apparatus 10 in place and prevents the loader vehicle 310 from lifting or tilting the cutter/bender apparatus 10. Therefore, a user of the cutter/bender apparatus 10 can safely work on the cutter/bender apparatus 10 without the fear that the cutter/bender apparatus 10 will be raised, lowered, or tilted.

Typically, the hydraulic seals on loader vehicles 310 tend to wear over time. This wear, along with other factors, may cause hydraulic pressure to slowly bleed from the system. Additionally, maintaining a high pressure in the hydraulic system for an extended period may cause seal damage. Therefore, if the device is set at a certain height for use, the pressure used to maintain the device at that height tends to damage the seals. Additionally, as the pressure in the system bleeds off, the cutter/bender apparatus 10 will slowly lower requiring that the user reset the device at its original height. However, by attaching the cutter/bender apparatus 10 to the loader vehicle 310 with the coupler member 350, the pressure can be released from the system and the coupler member 350 will maintain the raised position of the cutter/bender apparatus 10. Thus, the cutter/bender apparatus 10 is initially attached to the loader vehicle 310 and raised so that the coupler member 350 may be engaged. Once engaged, the pressure within the system used to raise the cutter/bender apparatus 10 may be released.

In an alternate embodiment for supporting the cutter/bender apparatus 10 during use, the cutter/bender apparatus 10 includes a pair of retractable legs 192. One of the retractable legs 192 is pivotally mounted to the front of the rack frame 170; and the other retractable leg 192 is pivotally mounted to the rear of the rack frame 170. The legs 192 are free to pivot between a stored position and a support position. In the support position, the legs 192 are set vertically and support the weight of the cutter/bender apparatus 10. The lengths of the legs 192, therefore, are sufficient to maintain the base at approximately an average user's waist. The apogee end of each leg 192 includes a leg chain lock 194 similar to the chain locks 264 previously described. A leg chain 196 attached to the rack frame 170 releasably mates with the leg chain lock 194 to selectively hold the leg 192 in the stored position. Note that this alternate embodiment does not include the safety advantages of the coupler member 350, but could be combined therewith to provide additional support.

Below the raised tray 242 mounted to the rack frame 170, a control mounting bracket 250 attached to the rack frame 170 provides support for the hydraulic control valve 252. Although more than one control valve and lever may be used, one control valve is preferable because it facilitates clamping of the workpiece 330 in the support member 88 by maintaining pressure on the second hydraulic cylinder 105 at all times. Referring to FIG. 9, the hydraulic control valve 252 having a control lever is in flow communication with the first hydraulic cylinder 20, the second hydraulic cylinder, and the hydraulic power system 320 and controls the flow of hydraulic fluids therebetween. Thereby, the user may control the position of the ram 24 by manipulating the control lever 252. A schematic of the hydraulic system is shown in FIG. 9. As previously noted, the hydraulic power system 320 may comprise that of a loader vehicle, an independent hydraulic power system 320, or that of some other vehicle or device. As shown in the figure, hydraulic fluid flows from the hydraulic power system 320 through communication lines to the hydraulic control valve 252. The user manipulates the hydraulic control valve 252 to direct the fluid to either move the hydraulic cylinders, 20 and 105, from a first position to their second positions (hereinafter referred to as "forward") or to move the cylinders 20 and 105, back (hereinafter referred to as "backward").

When the user places the hydraulic control lever 252 to move the hydraulic cylinders, 20 and 105, forward, the hydraulic control valve 252 directs the flow of hydraulic fluid from the hydraulic power system 320, through the hydraulic control valve 252, through the relief valve 340, and to the back side of the second hydraulic cylinder 105. This forces the ram 106 outwardly, from the first position to the second position, until the bending pin 100 makes contact with the workpiece 330. Once contact is made, the pressure in the system rises causing the relief valve 340 to "trip" and redirect the hydraulic fluid to the front side of the first hydraulic cylinder 20 raising the ram 24 from the first position to the second position until the motion is halted by the user or until the ram 24 is fully retracted. This forward motion forces hydraulic fluid from the front side of the second hydraulic cylinder 105 and the back side of the first hydraulic cylinder 20 which flows through the control valve 252 and to the return of the hydraulic power system 320. Consequently, the cutter/bender apparatus 10 is able to first clamp the workpiece 330 using the second hydraulic cylinder 105 and then bend the workpiece 330 using the first hydraulic cylinder 20. Using the hydraulic control valve 252, the user can stop the motion of the cylinders, 20 and 105, at any position and, thus, create any desired bend angle.

Likewise, when the user places the hydraulic control lever 252 to move the hydraulic cylinders, 20 and 105, backward, the hydraulic control valve 252 directs the flow of hydraulic fluid from the hydraulic power system 320, through the hydraulic control valve 252, to the back side of the first hydraulic cylinder 20 forcing the ram 24 downward from the second position to the first position and to the front side of the second hydraulic cylinder 105 forcing the ram 106 upward from the first position to the second position. This backward motion forces hydraulic fluid from the back side of the second hydraulic cylinder 105 and the front side of the first hydraulic cylinder 20 which flows through the control valve 252 and to the return of the hydraulic power system 320.

The second of the safety mechanisms is incorporated into the hydraulic system of the cutter/bender apparatus 10 and comprises a safety switch mechanism 370 as shown in FIG. 9. The safety switch mechanism 370 is a cut-off control valve 374, preferably a solenoid valve, positioned in the communication line providing fluid communication between the supply of the hydraulic power system 320 and the hydraulic control valve 252. Therefore, when the control valve 374 is closed, no hydraulic fluid may flow from the hydraulic power system 320 to the hydraulic control valve 252 or the rest of the system, including the hydraulic cylinders, 20 and 105. The control valve is in communication with the electrical power system 360 of the loader vehicle 310. A switch 372 positioned within the communication lines connecting the control valve 374 to the electrical power system 360 controls the position, open or closed, of the control valve 374. For example, when the switch 372 is open the control valve 374 is open; when the switch 372 is closed, the control valve 374 is closed. Of course the relationship to the switch 372 to the valve 374 may operate opposite to the example and multiple switches 272 may be used. The switch is positioned within the loader vehicle 310 such that it detects either the presence of an operator within the loader vehicle 310, the ability of the loader vehicle 310 to move or otherwise operate, or both.

For example, the switch 372 may be positioned and adapted within the loader vehicle 310 so that it detects when an operator is seated in the loader vehicle 310. In this situation, when an operator is seated in the loader vehicle 310, the switch 372 causes the control valve 374 to close preventing use of the cutter/bender apparatus 10. Thus, the cutter/bender apparatus 10 cannot be operated as long as an operator is in the loader vehicle 310 and, thereby, prevents an operator from moving the loader vehicle 310 or lifting or tilting the loader vehicle lift arms. In a second example, the switch 372 is adapted and placed to detect the position of the emergency brake and closes the control valve 374 unless the brake is set. In another example, the switch 372 is positioned and adapted to detect the position of a safety seat bar within the loader vehicle and closes the control valve 374 when the seat bar is in the lowered position. Many loader vehicles 310 include seat bars as a safety device and will not operate unless the seat bar is in the lowered position. In each of these examples, the switch 372 detects whether there is an operator in the loader vehicle 310 or whether the loader vehicle 310 may be operated. Preventing use of the cutter/bender apparatus 10 when one of these conditions is satisfied, improves the safety of the cutter/bender apparatus 10 by preventing the loader vehicle 310 from moving or otherwise operating while the cutter/bender apparatus 10 is in use. This allows a user to safely stand in front of the loader vehicle 310 and operate the cutter/bender apparatus 10 without the fear that the loader vehicle 310 will move. These exemplary switches 372 may be used individually, in combination with one another, or in combination with other similar switch devices.

While the apparatus described herein is the preferred embodiment of the invention, the invention is not limited to this precise form of apparatus and changes may be made to the invention without departing from its scope.

I claim:

1. An apparatus for cutting and bending a workpiece, comprising:

a support frame;

a support member coupled to the support frame adapted to receive and hold a portion of the workpiece and prevent movement of the portion of the workpiece relative to the support frame;

the support member defining a bending end of the workpiece to one side of the portion of the workpiece held by the support member;

an actuating member coupled to the support frame;

a movable bending member interconnected to the actuating member at a position offset from the support member;

a fixed cutting member coupled to the support frame;

a movable cutting member movably coupled to the support frame;

the actuating member interconnected to the moveable cutting member;

the actuating member is adapted to simultaneously move the moveable bending member and the cutting member between a first position and a second position;

the movable bending member is adapted and positioned to contact and move the bending end of the workpiece as the movable bending member travels from the first position to the second position;

so that the support member and the moveable bending member bend the workpiece about the support member as the movable bending member travels from the first position to the second position; and the fixed cutting member and the moveable cutting member are adapted and positioned to receive the workpiece and shear the workpiece as the movable cutting member moves from the first position to the second position;

so that a single motion of the actuating member actuates the moveable bending member and the cutting member simultaneously allowing selective bending of the workpiece, cutting of the workpiece, and allowing simultaneous bending and cutting of the workpiece.

2. The apparatus of claim 1, wherein the support member comprises:

a bending support plate attached to the support frame;

a bending pin attached to the support frame at an offset position from the bending support plate; and the bending support plate and the bending pin adapted to receive a portion of the workpiece therebetween and prevent its movement relative to the support frame.

3. The apparatus of claim 2, wherein the support member further comprises:

a plurality of sleeves adapted for selective, removable attachment to the bending pin; and each of the plurality of sleeves having a different outer diameter from the others.

4. The apparatus of claim 1, wherein the actuating member is adapted to move the movable bending member in a direction perpendicular to the workpiece when the workpiece is held in the support member.

5. The apparatus of claim 1, wherein:

the movable bending member pivotally connected to the actuating member at a pivot point and having an arcuate upper surface;

the arcuate upper surface adapted to create friction between the arcuate upper surface and the workpiece so that, as the movable bending member moves from the first position to the second position, the friction between the arcuate upper surface and the workpiece causes the movable bending member to rotate about the pivot point along the arcuate upper surface; and the pivot point of the movable bending member positioned such that the distance from the pivot point to the arcuate upper surface varies.

6. The apparatus of claim 1, wherein:

the movable bending member pivotally connected to the actuating member at a pivot point and having an arcuate upper surface;

the arcuate upper surface contacts the workpiece at a point of contact, and the pivot point of the movable bending member positioned such that the distance from the pivot point to the point of contact increases as the movable bending member moves from the first position to the second position.

7. The apparatus of claim 1, wherein the movable bending member bends the workpiece beyond 90 degrees when the movable bending member is in the second position.

8. The apparatus of claim 1, wherein the movable bending member bends the workpiece to 90 degrees when the movable bending member is in the second position.

9. The apparatus of claim 1, wherein:

the fixed cutting member and the movable cutting member are mounted in side-to-side abutment;

the movable cutting member is rotatably coupled to the fixed cutting member;

the fixed cutting member having a slot therein adapted and sized to receive the workpiece;

the movable cutting member having a slot therein adapted and sized to receive the workpiece;

the slots open to the periphery of the movable cutting member and the fixed cutting member respectively;

the slot of the fixed cutting member aligned with the slot of the movable cutting member when the movable cutting member is in the first position so that a workpiece may be placed in the aligned slots;

the slot of the fixed cutting member offset from the slot of the movable cutting member when the movable cutting member is in the second position; and so that, as the movable cutting member moves from the first position to the second position, the movable cutting member and the fixed cutting member shear the workpiece.

10. The apparatus of claim 9, further comprising:

the slots having a bottom;

the movable bending member having an upper surface;

the support frame having a base; and the distances from the base of the support frame to the upper surface of the movable bending member when the movable bending member is in the first position and to the bottom of the slots are substantially equal.

11. The apparatus of claim 1, wherein the actuating member comprises:

a hydraulic power system; and a hydraulic cylinder in fluid communication with the hydraulic power system coupled to the support frame.

12. The apparatus of claim 11, further comprising a hydraulic control valve in fluid communication with the hydraulic cylinder and the hydraulic power system adapted to control the flow therebetween.

13. The apparatus of claim 1, further comprising:

a measurement bar slidably attached to the support frame in a direction parallel to the workpiece when the workpiece is supported by the support member;

the measurement bar having measurement markings thereon; and the measurement bar positioned and adapted to facilitate measurement of the workpiece before cutting and before bending.

14. The apparatus of claim 1, wherein the support frame is adapted to be removably affixed to a loader vehicle.

15. The apparatus of claim 1, wherein the movable bending member, the support member, the fixed cutting member, and the movable cutting member are positioned and adapted so that the workpiece when placed in the support member and the movable bending member for bending is parallel to the workpiece when placed in the fixed cutting member and movable cutting member for cutting.

16. An apparatus for cutting and bending a workpiece comprising:

a support frame adapted to be removably affixed to a loader vehicle;

a support member coupled to the support frame adapted to receive and hold a portion of the workpiece and prevent movement of the portion of the workpiece relative to the support frame;

the support member defining a bending end of the workpiece to one side of the portion of the workpiece held by the support member;

an actuating member coupled to the support frame;

a movable bending member interconnected to the actuating member at a position offset from the support member;

a fixed cutting member coupled to the support frame;

a movable cutting member movably coupled to the support frame;

the actuating member interconnected to the moveable cutting member;

the actuating member is adapted to simultaneously move the moveable bending member and the cutting member between a first position and a second position;

the movable bending member is adapted and positioned to contact and move the bending end of the workpiece as the movable bending member travels from the first position to the second position;

so that the support member and the moveable bending member bend the workpiece about the support member as the movable bending member travels from the first position to the second position; and the fixed cutting member and the moveable cutting member are adapted and positioned to receive the workpiece and shear the workpiece as the movable cutting member moves from the first position to the second position;

so that a single motion of the actuating member actuates the moveable bending member and the cutting member simultaneously allowing selective bending of the workpiece, cutting of the workpiece, and allowing simultaneous bending and cutting of the workpiece.

17. The apparatus of claim 16, further comprising an attachment member coupled to the support member adapted to removably affix the support member to the loader vehicle.

18. The apparatus of claim 16, further comprising a carrier rack attached to the support frame.

19. The apparatus of claim 18, further comprising an attachment member coupled to the carrier rack adapted to removably affix the carrier rack to the loader vehicle.

20. The apparatus of claim 18, wherein the carrier rack having a workpiece carrier adapted to receive and hold a plurality of workpieces therein.

21. The apparatus of claim 18, wherein the carrier rack having a plurality of support guides attached thereto adapted and positioned to support the workpiece during bending and during cutting.

22. The apparatus of claim 18, wherein the length of the carrier rack is adjustable.

23. The apparatus of claim 18, wherein the carrier rack comprises:

a plurality of base tubes attached to the support frame and extending parallel to the workpiece when the workpiece is supported by the support member;

at least one connecting member attached to the plurality of base tubes;

at least one extension tube slidably connected to at least one of the plurality of base tubes;

the at least one extension tube extending parallel to the plurality of base tubes; and so that the at least one extension tube may be moved relative to the plurality of base tubes to lengthen the carrier rack.

24. A method for selectively bending and cutting a workpiece with a cutter/bender apparatus, comprising the steps of:

selectively placing the workpiece in a support member that is adapted to hold a portion of the workpiece stationary the support member defining a bending end portion of the workpiece to one side of the portion of the workpiece held by the support member;

moving a movable bending member that is offset from the support member and the portion of the workpiece held by the support member toward the bending end portion of the workpiece using an actuating member;

selectively placing the workpiece in a cutting member having a fixed cutting member and a movable cutting member; and moving the movable cutting member relative to the fixed cutting member using the actuating member.

25. The method of claim 24, further comprising the step of bending the workpiece beyond 90 degrees.

26. The method of claim 24, further comprising the step of removably attaching the cutter/bender apparatus to a loader vehicle.

27. The method of claim 26, further comprising the step of powering the actuating member with a hydraulic power system of the loader vehicle.

28. The method of claim 24, further comprising the step of changing the bending radius using a plurality of sleeves interchangeably coupled to the support member.

29. The method of claim 24, further comprising the steps:

inserting the workpiece in a pair of aligned slots in the fixed cutting member and the movable cutting member when the movable cutting member is in a first position;

moving the movable cutting member to a second position wherein the pair of slots are not aligned; and so that the movable cutting member and the fixed cutting member shear the workpiece as the movable cutting member moves from the first position to the second position.

* * * * *